United States Patent [19]

Thompson

[11] 4,312,540
[45] Jan. 26, 1982

[54] CONTINUOUS MINING APPARATUS AND METHOD

[76] Inventor: Thomas M. Thompson, Rte. 1, Box 122A, Beverly, W. Va. 26253

[21] Appl. No.: 53,439

[22] Filed: Jun. 29, 1979

[51] Int. Cl.³ .................... E21C 27/24; E21C 35/20
[52] U.S. Cl. .................................. 299/11; 198/313; 299/18; 299/57
[58] Field of Search .................. 299/11, 18, 64, 67, 299/56, 57; 198/313

[56] References Cited

U.S. PATENT DOCUMENTS

| | | | |
|---|---|---|---|
| 2,777,681 | 1/1957 | Ball | 299/57 |
| 3,107,776 | 10/1963 | Long | 299/570 X |
| 3,305,268 | 2/1967 | Todd | 299/18 |
| 3,788,452 | 1/1974 | McWilliams | 198/313 |
| 3,945,484 | 3/1976 | Oury | 198/313 |
| 4,031,997 | 6/1977 | Nelson | 299/64 X |
| 4,173,373 | 11/1979 | Campbell et al. | 299/18 X |

Primary Examiner—Ernest R. Purser
Attorney, Agent, or Firm—Fay & Sharpe

[57] ABSTRACT

A continuous mining apparatus and method for the underground mining of coal. The continuous mining apparatus includes a cutter assembly, conveyor assembly and base assembly. The base assembly is adapted to be maintained in a stationary position during a cutting operation. The cutter assembly is adapted to be projected outwardly from the stationary base assembly into the seam of coal for a substantial distance on the order of 80-100 feet. The conveyor assembly is positioned between the cutter assembly and the base assembly and, with the aid of telescoping members, provides two functions. First, the conveyor assembly provides for a variable length conveyor between the cutter assembly and the base assembly permitting the cutter assembly to project outwardly from the base assembly for varying distances of up to 80-100 feet. Second, the conveyor assembly serves as a means to crowd the cutter assembly into the coal seam without movement of the base assembly.

The method of mining of this invention provides method steps for the continuous mining of coal from seams.

23 Claims, 20 Drawing Figures

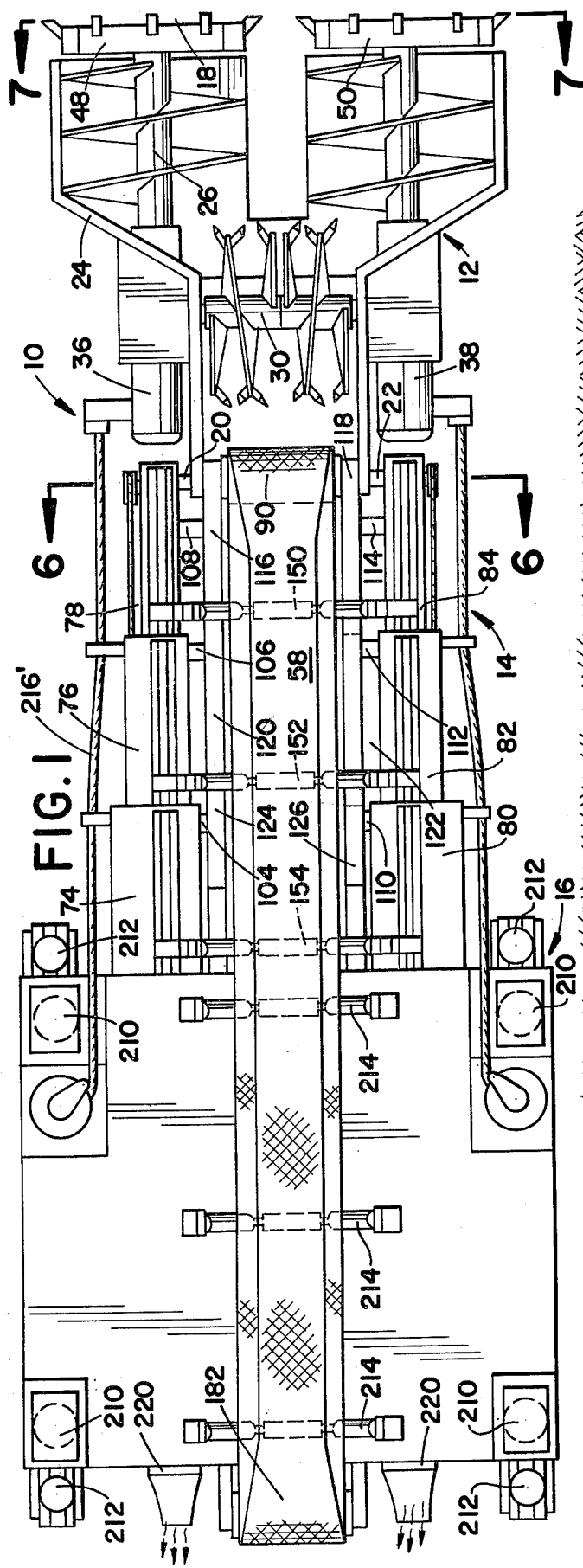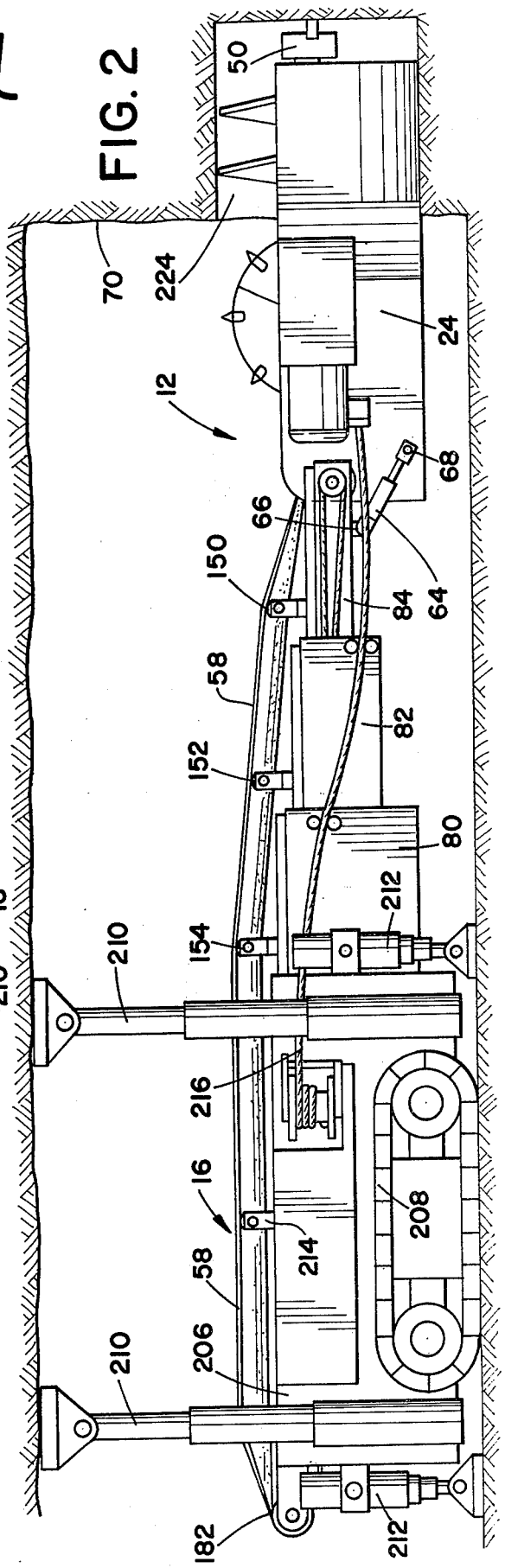

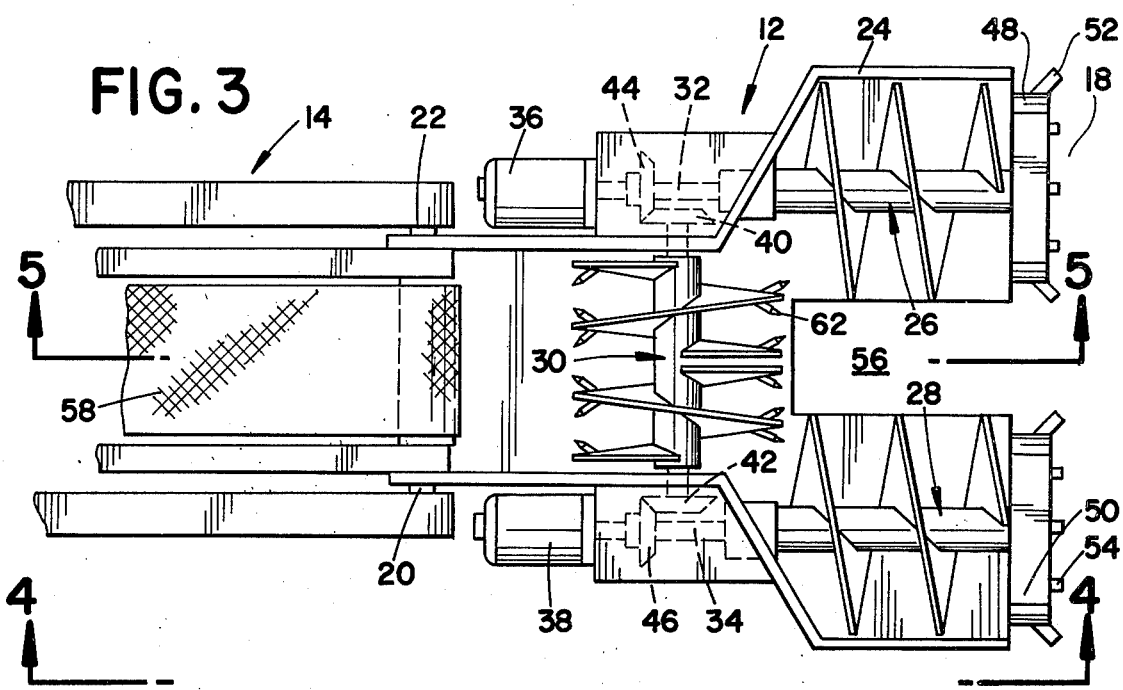
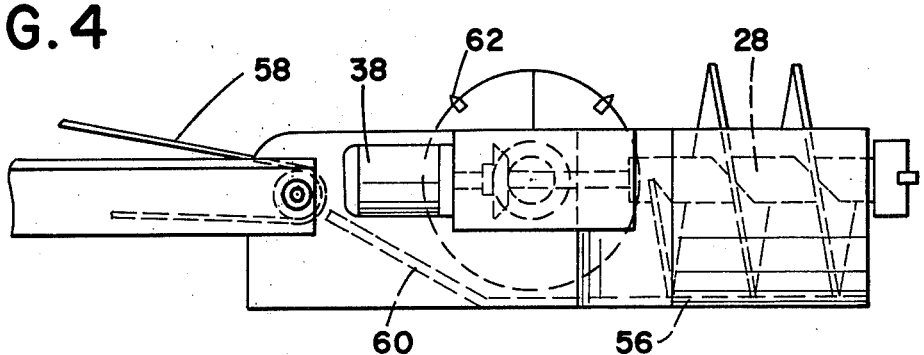
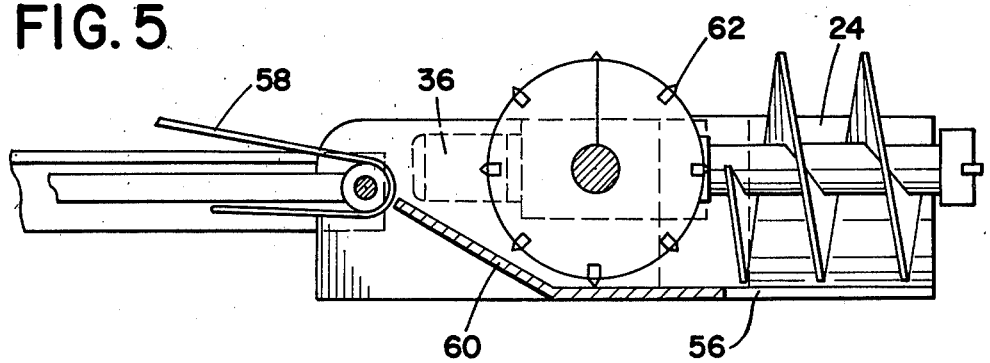

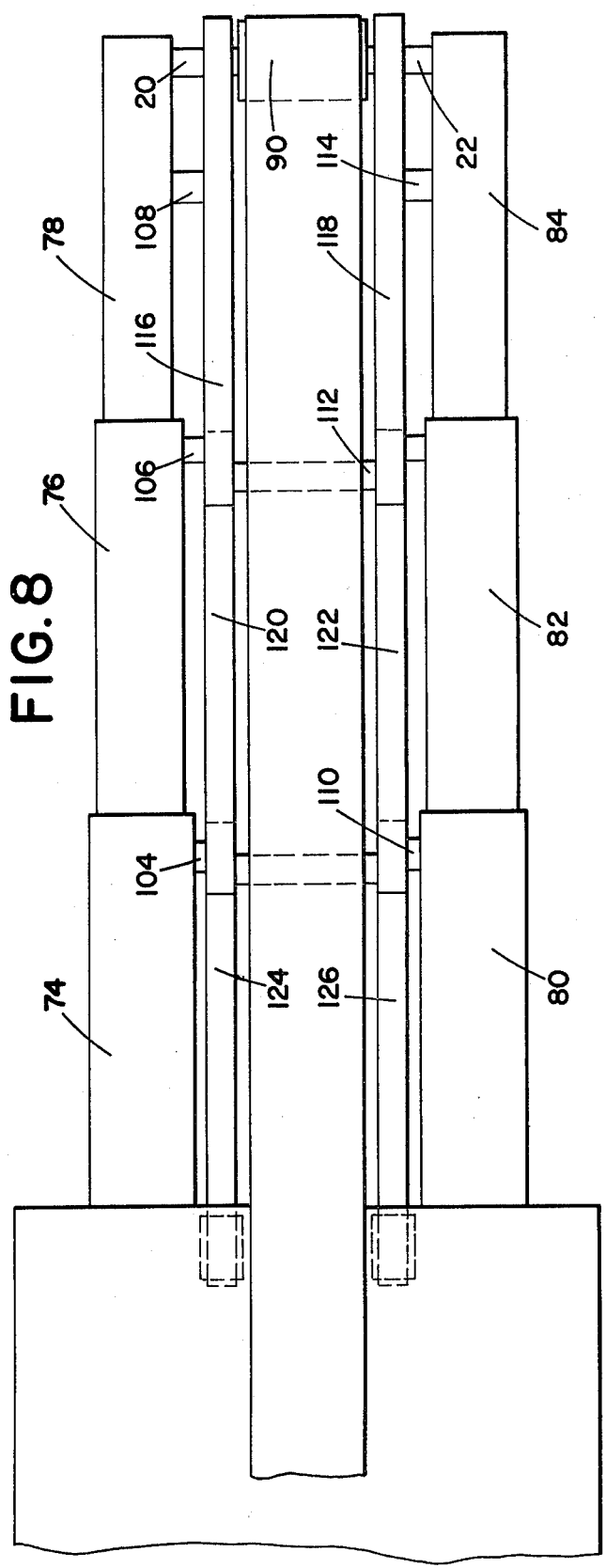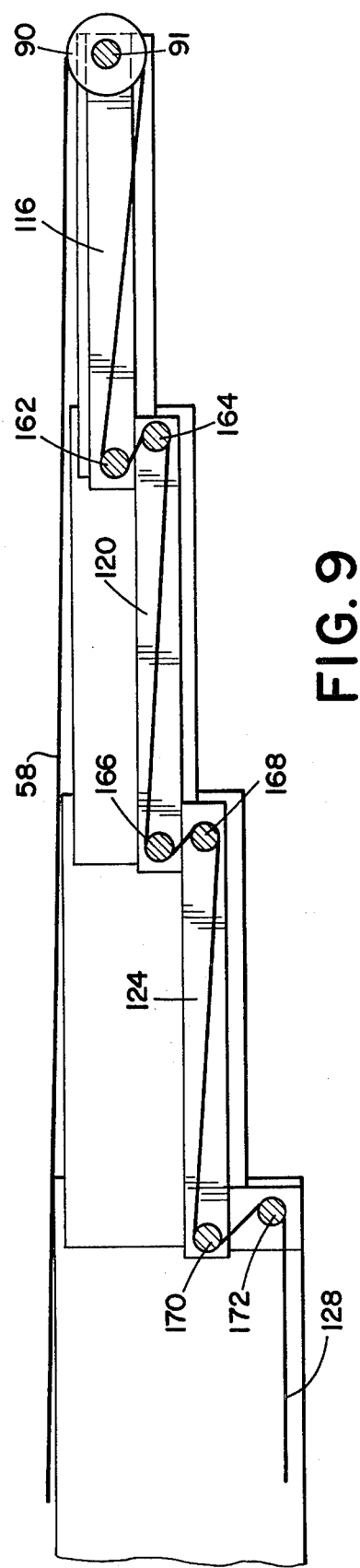

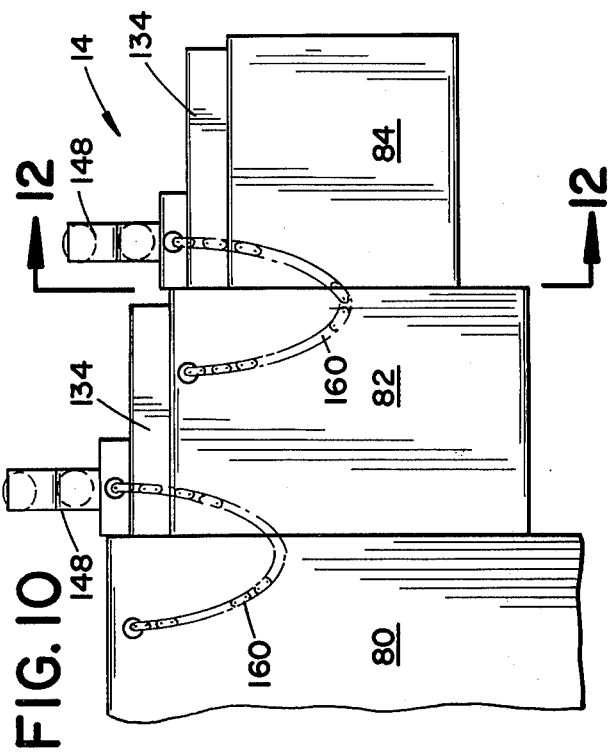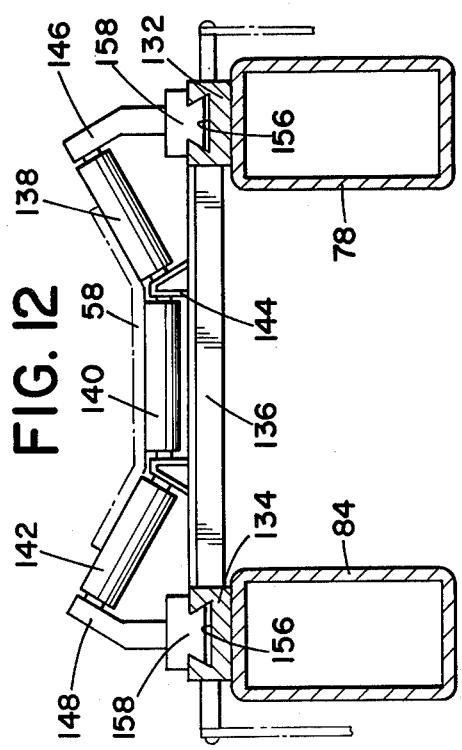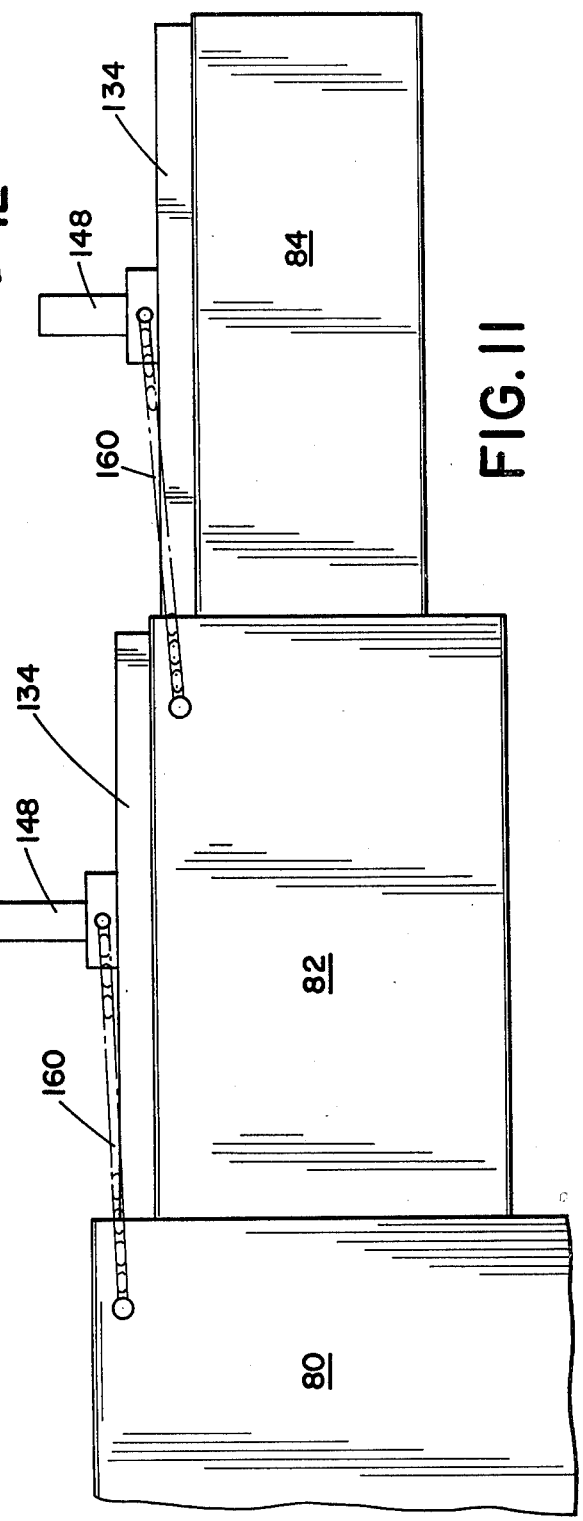

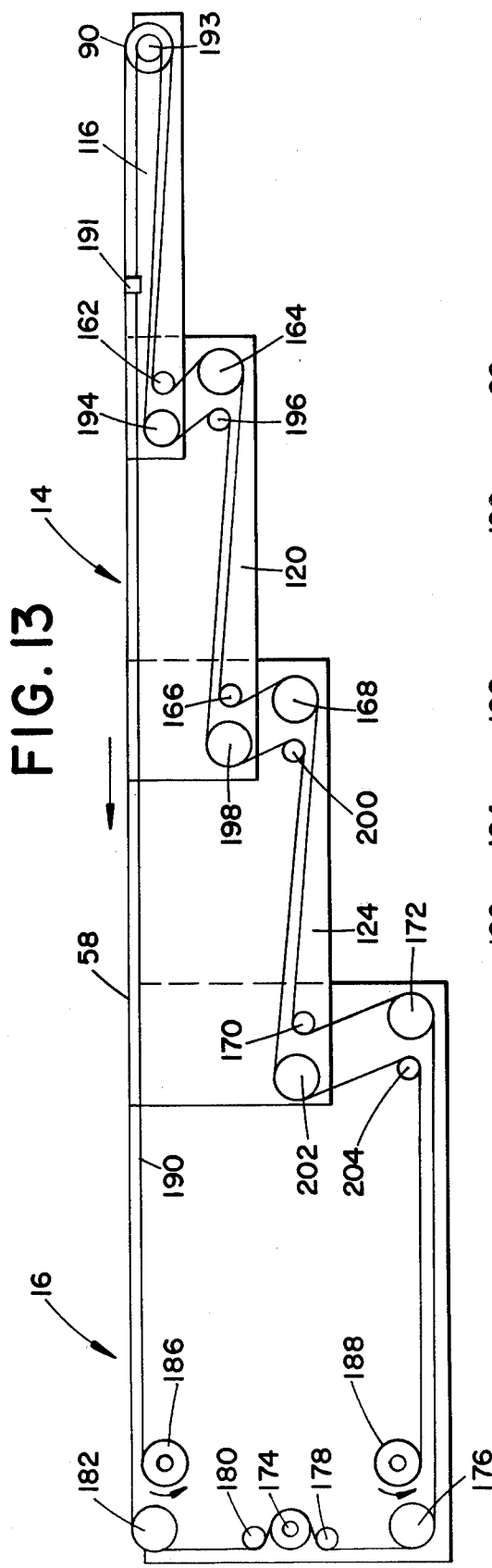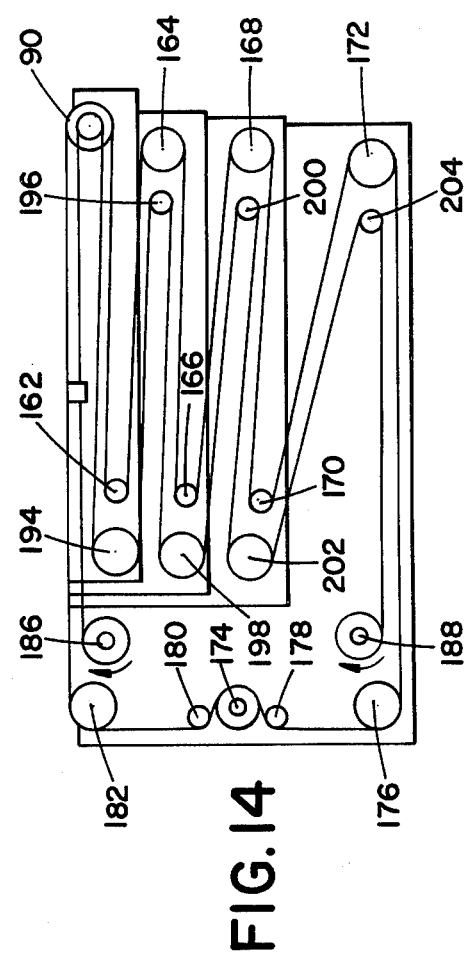
FIG. 13
FIG. 14

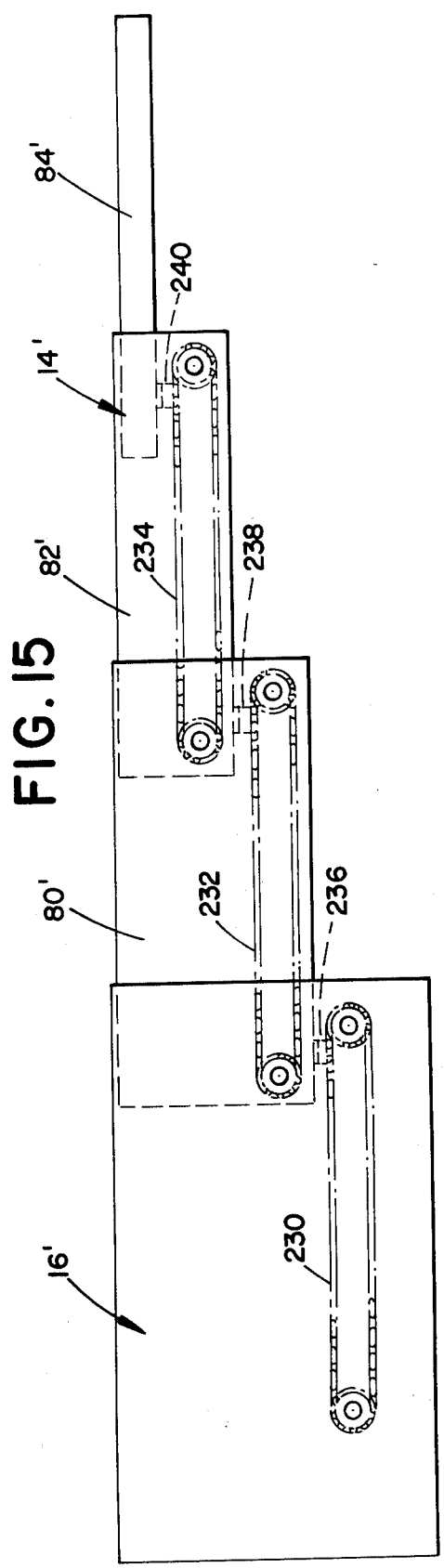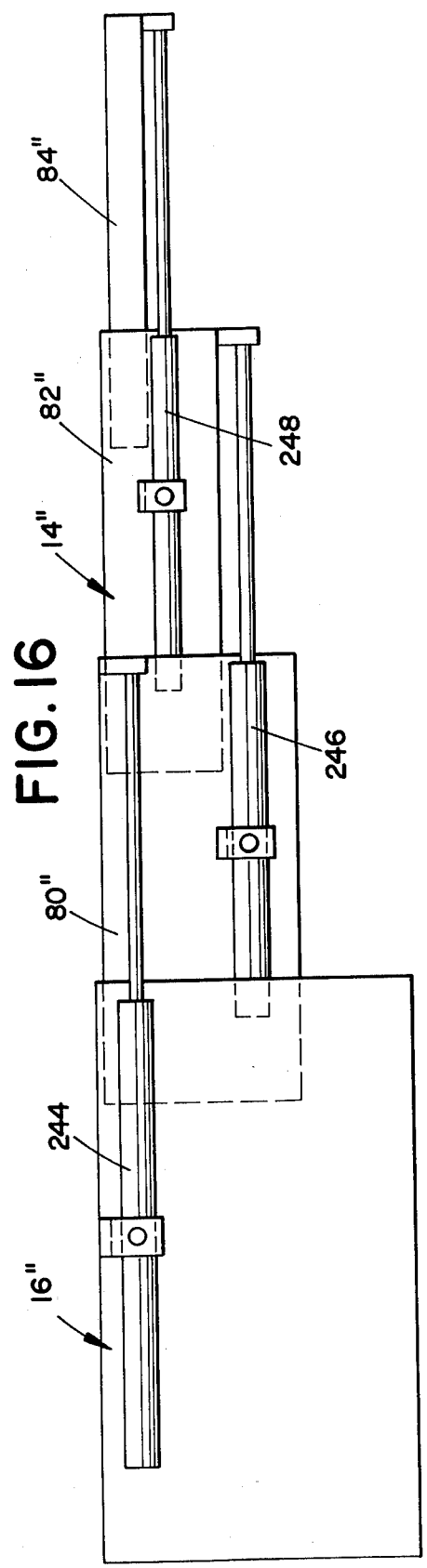

(PRIOR ART METHODS)

CONTINUOUS MINING APPARATUS AND METHOD

BACKGROUND OF THE INVENTION

This invention is directed to a continuous mining apparatus and method for the underground mining of coal from seams.

In underground coal mining a shaft, hole or tunnel is usually excavated to the coal seam. The miners then develop horizontal entries through the seam of coal so that the coal is mined through tunnels spreading out from the shaft, hole or tunnel. Elevators or other conveying means are used to lower or raise miners and equipment between the mine entrance at the surface and the level of the coal. Similarly, elevators or handling devices lift or convey the coal out of the mine.

The principal method of mining coal today employs a continuous miner which bites into the face of the coal seam and causes the coal to pass from the front of the machine to the rear thereof where it flows into shuttle cars or onto a conveyor belt. The continuous miner operates at the working face of the mine and eliminates separate cutting, drilling, blasting and loading operations called for in conventional mining.

At the workng face of the mine roof control methods are used in order to reinforce the roof and prevent its collapse during mining. One popular method of roof control involves the use of mine roof bolts and bearing plates. Such bolts are positioned in holes drilled into the mine roof. When tightened the mine roof bolt functions with the associated bearing plate as a clamp to hold the rock strata together to thus minimize the possibility of a roof fall.

In order to hold the mine roof bolt in place in the mine roof it is necessary to provide for some sort of anchorage system. Various devices are in use including mechanical expansion type anchors or shells and resin anchors, just to name a few.

The placement of mine roof bolts in an underground mine is time consuming. The precise locations of the bolts in the mine roof are set out in an approved roof control plan issued by the U.S. Department of the Interior, Mining Enforcement and Safety Administration. Each mine has its own mine roof control plan depending upon local conditions.

A typical mine roof control plan will call for the placement of mine roof bolts as a part of roof control at approximately five foot centers in the mine roof. Typical plans also provide that in mining the cut, the continuous mining machine shall not be advanced past the last row of permanent supports (bolts) until additional mine roof bolts have been put in place. Typically, only persons engaged in installing temporary supports or mine roof bolts are allowed to proceed beyond the last row of permanent supports or bolts. When installing supports or bolts in the face area typical plans permit workmen to be positioned not more than five feet from a temporary or permanent support.

Roof control methods including the placement of mine roof bolts thus limit the extent to which a continuous miner may operate in mining a cut. In some cases the continuous miner is permitted to advance only approximately ten feet into the coal face before it must be withdrawn in order to permit miners to install roof support systems.

As a consequence, therefore, of the implementation of safety standards involving mine roof control the continuous miner operates for only relatively short periods of time before roof control measures have to be installed. This necessitates a great deal of movement of the continuous miner from place to place as cuts are made and roof bolts are installed. It is not uncommon in an eight hour shift to experience only two hours of continuous miner operation with the remaining six hours of the shift devoted to movement of the continuous miner and roof control procedures such as bolting.

This invention contemplates a continuous miner and method in which relatively long cuts are made in a coal face (on the order of 80-100 feet) and in which it is not necessary for a miner to work in an unsupported area of the mine. More particularly this invention contemplates the use of a continuous mining apparatus in which the cutter assembly of the miner can be remotely advanced into the coal face for relatively long distances to enable relatively large amounts of coal to be removed from the seam without the necessity of stopping the miner and moving it to another location to permit mine roof control procedures to be put in place. Rather, applicant's apparatus and method contemplates the taking of relatively long cuts in the seam and the removal of the continuous miner to another location while mine roof control procedures are implemented in the relatively long cut just made.

BRIEF DESCRIPTION OF THE INVENTION

Briefly described, applicant's invention comprises apparatus and method for the continuous mining of coal from underground seams.

Applicant's apparatus comprises a continuous miner having a cutter assembly, conveyor assembly and base assembly. The cutter assembly is provided with a plurality of cutter means which cooperate with a plurality of augers in order to remove coal from an exposed coal face and cause such coal to be transported to the conveyor assembly. The conveyor assembly of applicant's apparatus is defined by a plurality of telescoping members which provide support for an endless variable length conveyor belt which extends from the base assembly of the apparatus to the cutter assembly. At least one control cable is provided within the telescoping members in order to provide for either extension or retraction of the telescoping members relative to each other. The conveyor assembly serves principally two functions. First, the conveyor assembly provides for expansible or variable length conveyor means between the cutter assembly and the base assembly whereby coal may be transported or carried from the cutter assembly to the base assembly as the cutter assembly is extended outwardly from the base assembly over variable distances. The second function of the conveyor assembly is to provide for crowd means to impart an end thrust to the conveyor assembly forcing it into the exposed coal face. The end thrust is imparted by means of the control cable disposed within the telescoping support members.

The conveyor assembly of applicant's apparatus is supported by a base assembly which includes internal propulsion means in order to provide for movement of the continuous miner. In addition, the base assembly includes substantially vertically oriented hydraulic cylinders which provide for support of the mine roof immediately above the base assembly and, in addition, allow lateral height adjustment of the base assembly in the mine enabling the cutter assembly to be positioned in virtually any vertical location for a mining operation.

Also included within the base assembly of the apparatus of this invention are control means suitable for operator use in connection with the continuous miner.

The methods of mining of this invention include method steps for the primary mining of coal in a room-and-pillar manner as well as method steps for the secondary mining of coal from pillars.

BRIEF DESCRIPTION OF THE DRAWINGS

The preferred embodiment of applicant's invention will now be described with reference to the drawings in which:

FIG. 1 is a top plan view of applicant's continuous mining apparatus;

FIG. 2 is a side elevational view of applicant's continuous mining apparatus;

FIG. 3 is a top plan view, partly in phantom, and showing the cutter assembly of applicant's continuous mining apparatus;

FIG. 4 is a side elevational view, partly in phantom, and taken along the line 4—4 of FIG. 3;

FIG. 5 is a side elevational view, partly in phantom, taken along the line 5—5 of FIG. 3;

FIG. 8 is a top schematic view of the conveyor assembly of applicant's continuous mining apparatus and showing the telescoping support frame;

FIG. 9 is a side schematic representation of the conveyor belt of the conveyor assembly of applicant's continuous mining apparatus showing the manner of support thereof;

FIG. 10 is a side elevational view showing the conveyor assembly of the continuous mining apparatus of applicant's invention in a collapsed position;

FIG. 11 is a side elevational view showing the conveyor assembly of the continuous mining apparatus of applicant's invention in an extended position;

FIG. 12 is an elevational view, partly in section, taken along the line 12—12 of FIG. 10;

FIG. 13 is a side schematic view of the conveyor belt and control cable of the conveyor assembly of the continuous mining apparatus of the invention and showing the manner of support thereof with the conveyor assembly in an extended position;

FIG. 14 is a side schematic view of the conveyor belt and control cable of the conveyor assembly of the continuous mining apparatus of the invention and showing the manner of support thereof with the conveyor assembly in a retracted or telescoped position;

FIG. 15 is a side elevational view, partly in phantom, and showing a modified embodiment of the conveyor assembly of the continuous mining apparatus of this invention;

FIG. 16 is a side elevational view, partly in phantom, and showing a further modified embodiment of the conveyor assembly of the continuous mining apparatus of this invention;

DESCRIPTION OF THE PREFERRED EMBODIMENT

Figure 6:
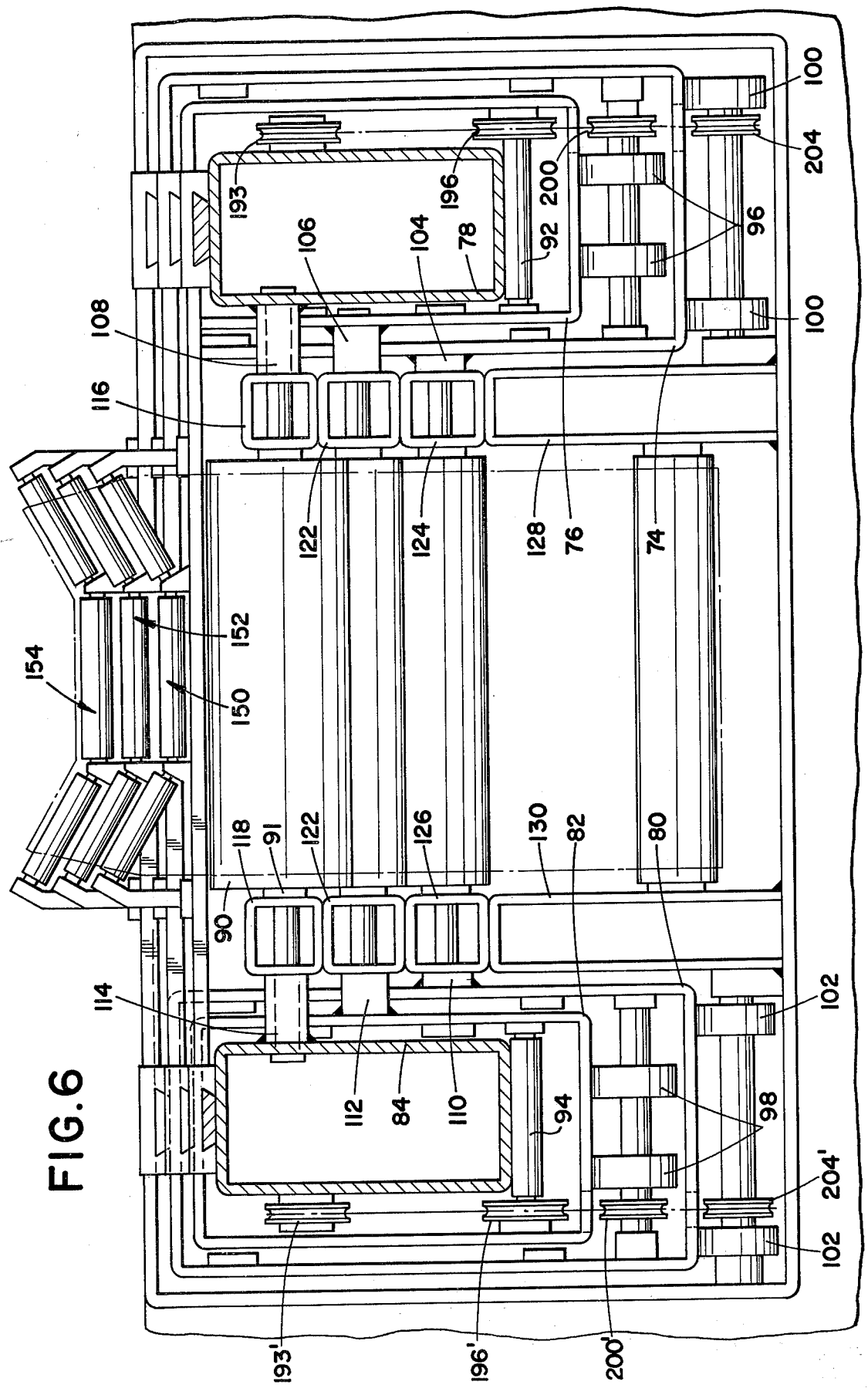
FIG. 6 is an elevational view, partly in section, taken along the line 6—6 of FIG. 1.

The preferred embodiment of the invention will now be described with reference initially to FIG. 1. The continuous mining apparatus of this invention is generally designated 10 in FIG. 1 and is made up of a cutter assembly 12, conveyor assembly 14 and a base assembly 16. For ease of description each of the various assemblies will now be described individually.

CUTTER ASSEMBLY

As best seen in FIGS. 1 and 3 the cutter assembly of the invention extends from the outermost end 18 of the continuous mining apparatus to the trunnions 20, 22 which are supported generally by the frame of the conveyor assembly 14 and which provide pivotal support for the cutter assembly 12. A generally U-shaped frame 24 is pivotally supported by trunnions 20, 22 and provides support for the longitudinal augers 26, 28 and the transverse auger 30. Longitudinal augers 26, 28 are driven by drive shafts 32, 34 which are, in turn, powered by motors 36, 38. The motors 36, 38, along with the associated drive apparatus are mounted on frame 24. Motors 36, 38 may be either electrically driven or hydraulically powered at the option of the user. If electrically driven, provision must be made for the supplying of an electrical source of power to the motors. If hydraulically powered provision must be made for the placement of hydraulic lines at the respective motors.

Transverse auger 30 is powered by a pair of bevel gears 40, 42 which are turned by complementary bevel gears 44, 46 driven by motors 36, 38 respectively.

Provided at the respective ends of longitudinal augers 26, 28 are cutters 48, 50. Cutters 48, 50 are provided with carbide cutting surfaces 52, 54 which are adapted to be rotated into cutting engagement with a coal face or seam. It should be understood that when motors 36, 38 are energized longitudinal augers 26, 28 along with the associated cutters 48, 50 are caused to rotate. Similarly transverse auger 30 is caused to rotate.

The cutter assembly of applicant's continuous mining apparatus is adapted to be thrust or crowded into the exposed coal face or seam at the working face of the mine in order to break up and chew coal into relatively small chunks at the exposed face. Once broke up by the rotating cutters 48, 50 the coal is accumulated in the bottom pan 56 of the cutter assembly where, after a sufficient accumulation of coal has developed, a flow of coal will proceed to the transverse auger 30. The function of the transverse auger 30 is to enhance the rearward movement of coal from the cutters 48, 50 to a location substantially adjacent the belt 58 of the conveyor assembly 14. As best seen in FIGS. 4 and 5 the bottom pan 56 takes an upward slope at 60 in order to cause the coal to be fed upward to the moving belt 58. Carbide cutting tips 62 are provided on the transverse auger 30 in order to further facilitate breaking up of the coal as it is conveyed to the moving belt 58.

Figure 7:
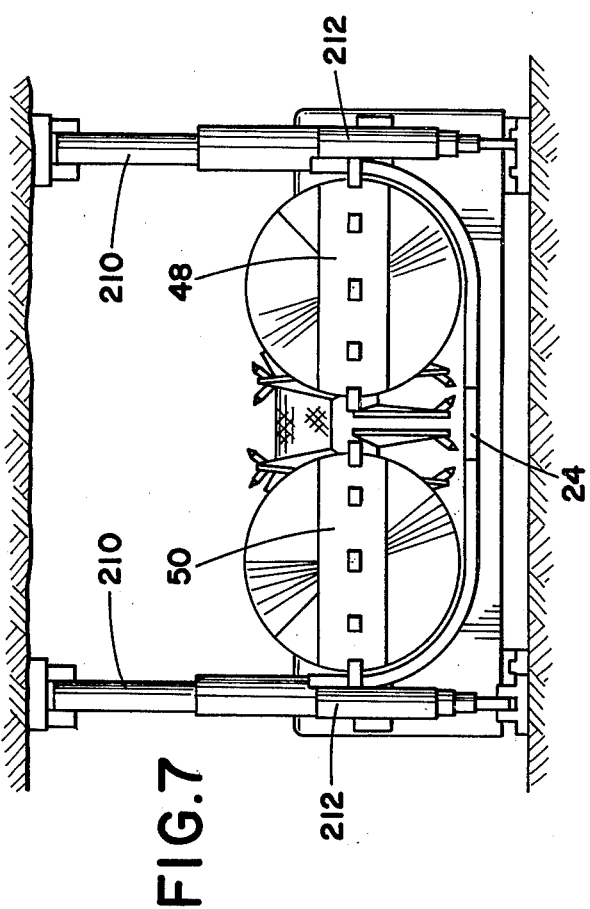
FIG. 7 is a front elevational view of the continuous mining apparatus of this invention taken along the line 7—7 of FIG. 1.

A front view of the cutter assembly is shown in FIG. 7. As will be seen from FIG. 7 frame 24, at the forward end of the cutter assembly, is generally U-shaped and defines a general scoop configuration in order to provide for the pick-up and retention of coal at the face after cutting has been accomplished by means of the rotating cutters 48, 50.

As was previously indicated, the entire cutter assembly 12 is pivoted to the conveyor assembly 14 by means of trunnions 20, 22 which are provided at the forward end of the conveyor assembly. As best seen in FIG. 2 a pair of attitude adjusting cylinders 64 are provided on either side of the cutter assembly 12. One end of adjusting cylinder 64 is connected to the conveyor assembly 14 at flange 66. The other end of adjusting cylinder 64 is connected to frame 24 at pin 68. It should be appreciated, therefore, that actuation of adjusting cylinder 64 through the application of either hydraulic or air pressure will cause the entire cutter assembly 12 to rotate about the axis of trunnions 20, 22 thus providing for adjustment of the attitude of the cutter assembly 12 relative to the coal face. Such coal face is designated 70 in FIG. 2.

CONVEYOR ASSEMBLY

Attention will now be directed to FIGS. 1 and 6 where the conveyor assembly 14 of applicant's continuous mining apparatus will now be described.

Before proceeding with a detailed description of the conveyor assembly 14 it should be understood that one of the purposes and functions of the conveyor assembly is to transport coal from the cutter assembly 12 to the base assembly 16. Base assembly 16, as shown in FIG. 2 and as will be described in greater detail below, is adapted to be fixed in place in the mine during operation of the continuous mining apparatus. That is to say once positioned as shown in FIG. 2 the base assembly 16 is adapted to remain stationary in the mine while the cutter assembly 12 is caused to move outwardly from the base assembly 16 into the coal face as is shown in FIG. 2. The purpose and function of the conveyor assembly 14 is to provide for a variable length conveyor belt between the cutter assembly 12 and the base assembly 16 while, at the same time, providing a means to crowd or move the cutter assembly 12 into the coal face.

Conveyor assembly 14 is supported by a plurality of telescoping box like support elements 74, 76, 78 and 80, 82, 84. Support elements 74, 80 are themselves secured to the base assembly 16 as best seen in FIGS. 1 and 2. In turn, the support elements 74, 80 provide rigid support for the telescoping inner members 76, 78 and 82, 84.

As best seen in FIG. 6 support elements 78, 84 are telescoped within the larger support elements 76, 82. Rollers 92, 94 are positioned within the support elements 76, 82 for the purpose of providing rolling support for the support elements 78, 84. Additional rollers are provided behind rollers 92, 94 (not shown) to provide for further support. In turn, support elements 76, 82 are slidably received within the larger support elements 74, 80. Rollers 96, 98 are provided within the support elements 74, 80 to provide sliding support for the elements 76, 82. Additional rollers (not shown) are provided within elements 74, 80 to support elements 76, 82.

It should thus be appreciated that the respective support elements 74, 76, 78 are slidably received within one another in a manner so as to provide for an extension or contraction of these elements relative to the base assembly 16. Similarly, the support elements 80, 82, 84 are slidably received within one another in order to provide for the expansion or contraction of these elements relative to the base assembly.

The largest of the support elements, i.e., 74, 80 are, in turn, slidably supported by rollers 100, 102 which are affixed to the base assembly 16 and which provide for sliding support of the elements 74, 80 relative to the base assembly 16. Additional rollers (not shown) are provided for the elements 74, 80.

Each of the respective pairs of support elements 74, 80; 76, 82, and 78, 84 are provided with a belt supporting structure of the type shown in FIG. 12. FIG. 12 shows the belt supporting structure for the outermost support elements 78, 84 and which includes supporting blocks 132, 134 which are secured respectively to the upper surfaces of support elements 78, 84 and a transverse support member 136. Rollers 138, 140, 142 are rotatably supported by a framework which includes member 144 secured to support member 136 and upwardly extending side members 146, 148. It should be appreciated as shown in phantom in FIG. 12 that the rollers 138, 140, 142 provide rolling support for the belt 58.

Each of the respective pairs of support elements is provided with a belt support structure of the type shown in FIG. 12. That is to say, each of the respective support elements 74, 80 and 76, 82 are provided with belt support structure of the type shown in FIG. 12. This may be seen from FIG. 6 wherein belt support structures 150, 152, 154 are generally shown. Belt support structure 150 generally corresponds to that shown in FIG. 12 and is associated with the support elements 78, 84. Belt support structure 152 is associated with the support elements 76, 82. Finally, belt support structure 154 is associated with the support elements 74, 80. The just mentioned belt support structures are also shown in FIG. 2 where it may be seen that the general level or height of belt 58 is caused to rise from a low point adjacent the cutter assembly 12 to a high point at the base assembly 16.

As will be seen from FIGS. 10, 11 and 12 the supporting blocks 132, 134 are generally elongated and extend along the upper surface of the respective support elements. As seen in FIG. 12 the supporting blocks 132, 134 are provided with an internal recess 156 which is of dovetail shape adapted to receive a complementary dovetail element 158 which is provided on the side members 146, 148. With the relationship of parts as shown in FIG. 12 it should be appreciated that the side members 146, 148 are free to slide with respect to the supporting blocks 132, 134 in order to provide for longitudinal adjustment of the belt support structures 150, 152, as the conveyor assembly 14 is moved either in a retracted or extended position.

As shown in FIG. 10 the conveyor assembly 14 is in a retracted position with the support element 84 telescoped within support element 82. In turn, support element 82 is telescoped within support element 80. As the support elements 84, 82 are caused to be telescoped within adjacent support elements it can be appreciated that the respective side members 146, 148 will be moved to the left of FIG. 10. A continuous telescoping action of the support elements will cause continued movement to the left of FIG. 10 of the side members 146, 148 until such time as the side members contact an adjacent support element. Further telescoping action of the support elements may continue with a sliding action taking place between the side members 146, 148 and the respective supporting blocks 132, 134.

At such time as the conveyor assembly 14 is placed in an extended position, movement of the support elements will progress to the right as shown in FIGS. 10 and 11. A movement to the right of the support elements as shown in FIG. 11 will cause a similar movement to the right of the side members 146, 148 until such time as the chains 160 become taut. As will be evident from FIG. 11 each of the respective chains is attached, at one end, to a side member 148 and at the other end to a support element. As the respective support elements are extended a point in time will be reached when the chains 160 become taut causing an associated side member 148 to become fixed relative to an adjacent support element. Continued outward movement of the support elements will cause a sliding motion to take place between the side members 146, 148 and the associated supporting blocks 132, 134.

The purpose and function of the dovetail interconnection between the belt support structures and the associated supporting blocks is to provide means to longitudinally adjust the belt supporting structures regardless of the degree of extension or retraction of the conveyor assembly 14. That is to say, as the conveyor assembly 14 is extended (as shown in FIG. 11) the belt support structures become more widely separated in order to provide for uniform support of the belt. Conversely, when the conveyor assembly 14 is retracted or telescoped (as shown in FIG. 10) the belt support structures come together but in a uniform manner so as to provide for a uniform or even support of the belt.

Turning to FIG. 1 it will be seen that the end of belt 58 nearest the cutter assembly 12 is supported by means of roller 90. Roller 90 is, in turn, supported by an internal roller shaft 91 which is itself supported by longitudinal supports 116, 118 (FIG. 6). Supports 116, 118 are secured to the support elements 78, 84 by means of pins 108, 114. It should thus be understood that the longitudinal supports 116, 118 extend generally parallel to the support elements 78, 84 and are affixed thereto by means of pins 108, 114.

Similarly, longitudinal supports 120, 122 are provided generally parallel to support elements 76, 82 and are affixed thereto by means of pins 106, 112.

In the same manner longitudinal supports 124, 126 extend generally parallel to support elements 74, 80 and are affixed thereto by means of pins 104, 110.

As best seen in FIG. 6 the longitudinal supports 116, 118, 120, 122, 124 and 126 are arranged in pairs one above the other so as to be capable of being nested when the conveyor assembly 14 is contracted or telescoped together. Additional support for the nested longitudinal supports is provided by lower supports 128, 130 (FIG. 6) which are affixed to the base assembly 16.

The purpose and function of the longitudinal supports 116, 118, 120, 122, 124 and 126 is to support a plurality of rollers over which the conveyor belt 58 is adapted to pass in order to define an adjustable length conveyor. The threading conveyor assembly is shown schematically in FIG. 9.

Referring to FIG. 9 it may be seen that the longitudinal support 116 (and the complementary support 118 not shown) support roller 90 with its associated roller shaft 91. In addition, longitudinal support 116 (and its complementary support 118) support roller 162.

Longitudinal support 120 (and its complementary support 122) support rollers 164 and 166.

Longitudinal support 124 (and its complementary support 126) support rollers 168 and 170.

Finally, lower support 128 (and its complementary support 130) support roller 172.

It should be appreciated from a study of FIG. 9 that the conveyor assembly 14 which is shown extended in the schematic view of FIG. 9 defines a variable length conveyor which utilizes an essentially fixed length conveyor belt 58. The nested longitudinal supports 116, 120, 124 and the complementary longitudinal supports 118, 122, 126 provide for an adjustable length conveyor which may be set to provide for any measurement of length from the fully telescoped or fully collasped position of the conveyor assembly shown schematically in FIG. 14 to the fully extended position shown schematically in FIGS. 9 and 13.

Figure 17:
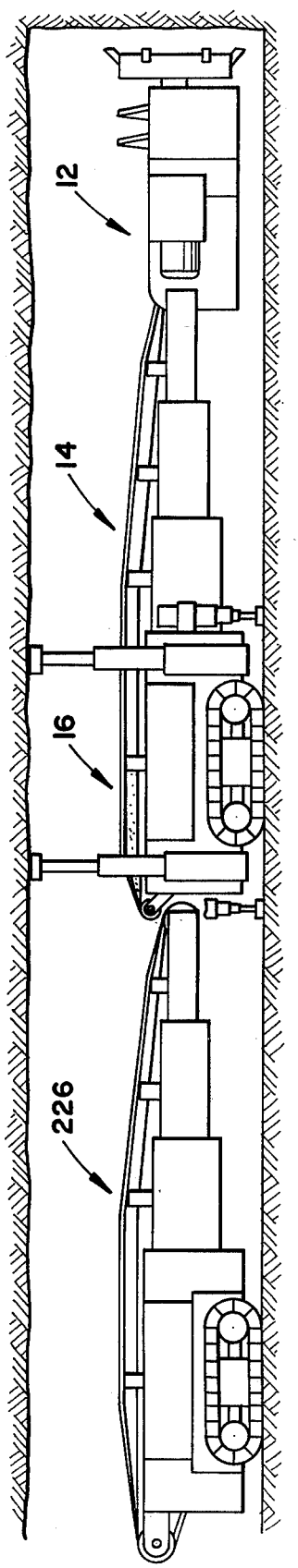
FIG. 17 is a side elevational view of the continuous miner of this invention operating with an auxiliary conveyor.

Referring to FIG. 13 it will be seen that conveyor belt 58 is powered by drive 174 which is fixed to the base assembly 16. In addition to drive 174, idler rolls 176, 178, 180 and 182 are provided in the base assembly 16 in order to complete threading of the conveyor belt 58 throughout the assembly. It should thus be appreciated from a study of FIG. 13 that when powered the drive 174 causes the conveyor belt 58 to move in the arrow direction shown (from right to left in FIG. 13) in order to transfer coal from the cutter assembly (adjacent the roller 90) to the rear of base assembly 16 where it is thereafter conveyed to additional conveying apparatus provided in the mine as shown in FIG. 17.

As has been previously noted the length of the conveyor belt 58 is essentially fixed when threaded into the conveyor assembly and base assembly in the manner shown schematically in FIG. 13. Because of the arrangement of the several elements of the conveyor assembly and base assembly the total length of the conveyor belt 58 will not vary regardless of the degree of retraction or expansion of the conveyor assembly.

Turning once again to FIG. 13 attention will now be directed to the graphical representation of the wire rope mechanism for telescoping and expanding the conveyor assembly 14 of the invention.

As seen in FIG. 13 a pair of drive means 186, 188 are housed within the base assembly 16. The drive means are adapted to rotate in selective clockwise or counterclockwise directions as will be described below. A cable 190 is wound about drive means 186, attached to support element 78 at 191 and is threaded through a plurality of rollers supported by the several longitudinal supports 116, 120, 124 where it is thereafter wound about drive means 188. Longitudinal support 116 provides support for cable rollers 193 and 194. Longitudinal support 120 provides support for cable rollers 196, 198. Longitudinal support 124 provides support for cable rollers 200, 202. Finally base assembly 16 provides support for cable roller 204.

It should be appreciated that the schematic representation of the cable 190 and the associated cable rollers as shown in FIG. 13 represents but one side of the cable drive system for the conveyor assembly 14. A similar cable drive system is provided at the other side of the conveyor assembly in connection with the support elements 80, 82, 84 and the longitudinal supports 118, 122, 126.

The cable rollers 193, 194, 196, 198, 200, 202 and 204 and attachment point 191 are shown schematically in FIG. 13 as being associated with the longitudinal supports 116, 120, 124. This is for ease of description to show the interrelationship of the conveyor belt 58 and the cable drive 190. In actuality, however, the respective cable rollers 193, 194, 196, 198, 200, 202, 204 and attachment point 191 are carried by the respective support elements as is shown more particularly in FIG. 6. Thus the cable rollers 193, 194 and attachment point 191 are associated with the support element 78 and are carried or supported by the wall of the support element 78 in the space defined between the support element 78 and the support element 76. Cable roller 193 is shown in FIG. 6. Cable roller 194 is not shown in FIG. 6 but it should be understood that it is located immediately behind the cable roller 193 and is supported by the support element 78 in the same manner as the support provided for the cable roller 193. The cable roller 196 is attached to and supported by the wall of the support element 76 in the space between the support element 78 and support element 76. The cable roller 198 is not shown in FIG. 6 but it should be understood that it is located immediately behind the cable roller 196 and is supported by the support element 76 in the same manner as the support provided the cable roller 196.

Cable roller 200, in FIG. 6, is supported by the support element 74 and is located between the bottom walls of the support element 76 and the support element 74. Cable roller 202 is not shown in FIG. 6 but it should be understood that it is located immediately behind cable roller 200 and is supported in a manner similar to cable roller 200.

Finally, cable roller 204 is positioned, in FIG. 6, beneath support element 74 and is supported by the base assembly 16.

It should be understood that cable rollers corresponding to those designated 193, 194, 196, 198, 200, 202 and 204 are provided in association with the support elements 80, 82 and 84. These cable rollers are designated 193', 196', 200' and 204' in FIG. 6.

Referring once again to FIG. 13 it should be understood that the conveyor assembly 14 as shown in FIG. 13 is in a fully extended position. If it is desired to shorten the length of the conveyor assembly this is accomplished by a counterclockwise driving of drive means 186 and counterclockwise rotation of drive means 188. Counterclockwise driving of the drive means 186 causes the cable 190 to be taken up in the upper portion of the conveyor assembly 14 (as viewed in FIG. 13). At the same time drive means 188 is permitted to rotate in a counterclockwise direction so as to pay out cable from drive 188. This, in turn, causes the support elements to become nested or collasped as shown in FIG. 14.

Should it be desired to extend or open the conveyor assembly 14 from the collasped position shown in FIG. 14 this may be accomplished by causing the drive means 188 to be driven in a clockwise direction so as to take up cable 190 in the lower portion of the conveyor assembly. At the same time drive means 186 is permitted to rotate in a clockwise direction so as to pay out cable from drive 186.

It may thus be seen that the cable drive mechanism of this invention provides for positive positioning of the conveyor assembly 14 into a variable length conveyor having a minimum longitudinal length as shown in FIG. 14 and a maximum longitudinal length as shown in FIG. 13.

BASE ASSEMBLY

Attention will now be directed to FIGS. 1 and 2 where the base assembly 16 of this invention will now be described.

As best seen in FIG. 2 the base assembly 16 includes a main body 206, drive tracks 208 and a plurality of hydraulic cylinders 210, 212.

Main body 206 of base assembly 16 provides a convenient housing for internal elements of the apparatus of this invention including engine drive means for tracks 208, cable drive means 186, 188 (shown schematically in FIG. 13), conveyor belt drive means 174 (shown schematically in FIG. 13), and associated and additional control apparatus.

Drive tracks 208 are of conventional design adapted to be powered by internal engine means and, when activated, may propel the base assembly either forward, backward, or in a turning direction as by counterrotation of the tracks.

With reference to FIGS. 1 and 2 it will be noted that four generally vertical hydraulic cylinders 210 are provided at approximately the corners of the base assembly 16. Hydraulic cylinders 210 have two principal functions. First, the cylinders provide for roof support at the base assembly 16 thus protecting the operator and the base assembly from damage due to a cave-in of the roof. Second, hydraulic cylinders 210 function to position the base assembly 16 firmly in place during a cutting operation. Hydraulic cylinders 210 thus function to wedge the base assembly 16 in place as the cutter assembly 12 is advanced or crowded into the coal face.

Generally vertically disposed hydraulic cylinders 212 are also provided at corner extensions of the base assembly 16 as shown in FIGS. 1 and 2. The purpose and function of cylinders 212 is to adjust the height of the base assembly 16 in the mine. In the position shown in FIG. 2 the base assembly 16 is resting on the mine floor with the tracks 208 in contact with the floor. It can be appreciated, however, that by extending hydraulic cylinders 212 and retracting hydraulic cylinders 210 the entire base assembly 16 may be lifted from the floor to various heights.

Also associated with the base assembly 16 are a plurality of belt support structures 214 which provide support for the drive belt 58 as it passes over the base assembly 16. An end roller 182 is supported by the base assembly 16 and defines the point where the conveyor belt 58 is routed back into the base assembly 16 to the internally disposed drive 174 (shown schematically in FIG. 13).

As shown in FIG. 2 the base assembly 16 is provided with an electrical cable 216 which extends from the base assembly 16 to the cutter assembly 12. Electrical cable 216 is adapted to provide electrical power to the motor 38. A similar electrical cable 216' (FIG. 1) is provided at the opposite side of the base assembly 16 for the purpose of supplying power to the motor 36.

In addition to supplying power to the cutter assembly 12 the base assembly 16 also provides for ventilation means at the face of the mine. Such ventilation means is shown schematically at 220 in FIG. 1 and includes exhaust fans (not shown) mounted in the base assembly 16 which are adapted to draw air from the face of the mine where the cutting operation is taking place and conduct the air through the interior of the telescoped supporting elements 74, 76, 78 and 80, 82, 84 where it is then conveniently transmitted through the base assembly.

OPERATION

The operation of the continuous mining apparatus of this invention will now be described with reference principally to FIG. 2. Assume initially that it is desired to make a cut into the coal face 70. The continuous mining apparatus including the cutter assembly 12, conveyor assembly 14 and base assembly 16 is caused to be positioned at the coal face 70 with the conveyor assembly in a collasped or retracted configuration. That is to say, the conveyor assembly 14 of the continuous mining apparatus is in a minimum length condition.

Once positioned in place with the conveyor assembly 14 collasped the hydraulic cylinders 210, 212 are then adjusted in order to fix the base assembly 16 in place at the desired height. It should be appreciated that all times during the cutting operation to be described the base assembly 16 is fixed in place.

The operator of the continuous mining apparatus is positioned either adjacent or behind the base assembly 16. The cutting operation begins as power is directed to the motors 36, 38 causing the cutters 48, 50 to rotate. In addition to supplying a source of electrical energy for the motors 36, 38 the operator causes the conveyor belt drive means 174 to become operating as well as the cable drives 186, 188. It should be understood that with the belt drive 174 in operation the upper surface of the conveyor belt 58 is caused to move from right to left as shown in FIG. 2.

Activation of the cable drive means 186, 188 in the appropriate rotational mode will cause the fully collasped conveyor assembly 14 to become elongated. This action not only causes the longitudinal length of the conveyor assembly 14 to increase but also causes the cutter assembly 12 to be advanced or crowded into the coal face 70. With an end thrust thus being provided at the cutter assembly, the cutters 48, 50 are driven into the coal face causing the coal at the face to become disintegrated where it is collected at the cutter assembly 12 and thereafter conveyed to the base assembly 16. Continued operation of the cable drive mechanism will cause the cutter assembly 12 to dig deeper and deeper into the coal face until such time as the continuous mining apparatus is shut down or, alternately, until the conveyor assembly 14 reaches a point of maximum extension. Once the conveyor assembly 14 is extended to a maximum degree no further end thrust may be applied to the cutter assembly 12. It is thus not possible to continue the cutting operation until the base assembly 16 has been repositioned.

While the length of the several components of the invention including the cutter assembly 12, conveyor assembly 14 and base assembly 16 may vary depending upon design considerations it is projected that the cutter assembly 12, in the preferred embodiment, may be extended outwardly from its initial position at the coal face 70 at the start of the cutting operation to approximately 80–100 feet from its initial position with the conveyor assembly 14 completely extended. That is to say, the difference between the collasped length of the conveyor assembly 14 and the fully extended length of the conveyor assembly is approximately 80–100 feet in the preferred embodiment. This enables a single cut of approximately 80–100 feet to be made in the face of the coal by the cutter assembly 12.

As shown in FIG. 2 the cut 224 being made in the face 70 is in the lower portion of the face. In actuality, however, it may be desirable to make the initial cut in the face at the upper portion of the face near the roof. An upper cut may be made by causing the entire assembly 16 to be elevated through extension of the hydraulic cylinders 212 and retraction of the hydraulic cylinders 210. Once elevated the entire continuous mining apparatus of the invention including the cutter assembly 12 will be caused to be elevated thus positioning the cutters 48, 50 in the upper portion of the mine. In the preferred embodiment the vertical height of the cut 224 made by the cutter assembly 12 is approximately five feet. Thus, should the vertical height of the coal face 70 be approximately 10 feet two cuts may be conveniently made in the coal face (an upper cut and a lower cut) in order to remove all of the coal at the face.

Once the coal has been conveyed from the cutter assembly 12 to the base assembly 16 it, thereafter, is conveyed to the main entry where it is then taken from the mine. Suitable conveyors may be used for this purpose such as conveyor 226 shown in FIG. 17.

MODIFICATIONS OF THE INVENTION

Two modified forms of the drive mechanism for the conveyor assembly 14 are shown in FIGS. 15 and 16.

With reference to FIG. 15, a conveyor assembly designated 14' is made up of telescoping support elements 80', 82' and 84'. These telescoping elements extend from the base assembly 16'. In lieu of the cable drive mechanism shown schematically in FIG. 13 the interengaging support elements of FIG. 15 are adjusted by means of roller chains 230, 232 and 234. Roller chain 230 provides for relative movement of support element 80' with respect to base assembly 16' by means of the drive flange 236 which is secured to the support element 80'. Similarly, movement of support element 82' with respect to support element 80' is accomplished by means of roller chain 232 which is secured to drive flange 238 which extends from support element 82'. Finally, movement of support element 84' relative to support element 82' is achieved by means of roller chain 234 which is adapted to move drive flange 240 either to the right or to the left of FIG. 15. The several roller chains 230, 232, 234 of FIG. 15 may be driven by any convenient drive means including, but not limited to, electric motors or hydraulic motors.

A further modified embodiment of the drive means for the conveyor assembly 14 is shown in FIG. 16. In FIG. 16 the conveyor assembly 14" is shown as comprising the support elements 80", 82" and 84". Hydraulic cylinder 244 is attached to the base assembly 16" and provides for movement of the support element 80" with respect to base assembly 16". Hydraulic cylinder 246 is attached to support element 80" and provides for relative movement of the support element 82" relative to support element 80". Finally, hydraulic cylinder 248 is secured to support element 82" and provides for relative movement of the support element 84" relative to support element 82".

The various hydraulic cylinders 244, 246, 248 of FIG. 16 are adapted to be powered by any source of pressurized fluid as may be convenient.

METHOD

Applicant's method of mining coal from seams will now be described.

Figure 18:
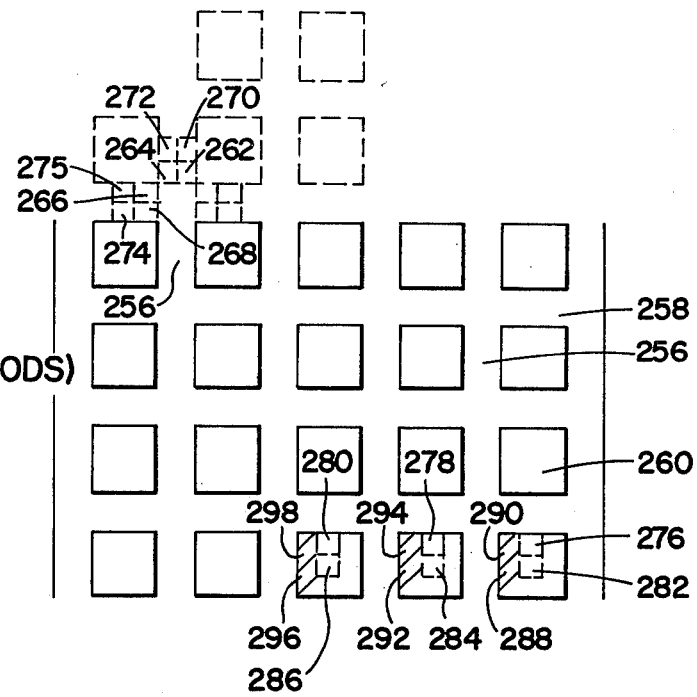
FIG. 18 is a top schematic view of a mine and showing one conventional method of the primary and secondary mining of coal in a room-and-pillar configuration.

Referring first to FIG. 18 there is shown therein a schematic representation of a plan view of a coal mine and showing the conventional manner of removal of coal therefrom. The mine of FIG. 18 includes a number of main passageways or main entries 256 and a plurality of crosscuts 258. The crosscuts 258 generally extend perpendicular to the main entries 256. The several main entries and crosscuts define a plurality of pillars of coal 260. Depending upon applicable laws pillars 260 may have various dimensions. A 50 by 50 foot dimension is a typical minimum pillar size in many states.

The primary mining of coal from a seam involves, therefore, the removal of coal by driving a series of "rooms" into the coal thereby defining a plurality of pillars which are left standing to support the roof until the area is mined out in secondary mining. FIG. 18 represents, therefore, a room-and-pillar approach to primary mining of coal. The process of secondary mining a mine involves the removal of a part or all of the pillars permitting the roof to cave in. Removal of the pillars is systematic in order to provide for protection of both miners and their equipment.

In a typical mine the pillars 260 of FIG. 18 will have a square dimension of approximately 50 feet on a side. The distance between the pillars, i.e., the width of the crosscut and the width of the main entry or passageway is approximately 20 feet.

A continuous miner operating today can remove in a single cutting operation a volume of coal having dimensions of approximately 10 feet wide, 20 feet deep and 5 feet high. The width dimension of the miner (approximately 10 feet) is governed by the width of the cutter of the miner. The length dimension of the cut made by the miner is governed by applicable safety regulations. As a miner makes a cut into a face of coal the newly exposed roof over the working miner is unsupported. Applicable safety regulations usually provide that the operator of the miner may not advance into the coal face more than a few feet (usually four or five feet) from the last mine roof support (bolt or post). Faced, therefore, with the limitation that the operator of a continuous miner cannot extend himself more than four or five feet from the last mine roof support it is not possible for a continuous miner to extend into a face of coal for more than approximately 20 feet. Having done so the miner is then withdrawn and mine roof control measures are then installed. Once installed the miner may re-enter the area of the cut and make a second cut for approximately an additional 20 feet.

The process of mining using a conventional continuous miner is thus one of stop and go. Once a cut of approximately 20 feet is made in the coal face it is necessary to withdraw the miner for bolting or other roof control measures. During the interim time when mine roof control procedures are being implemented the miner may proceed to another portion of the mine and make a new cut.

Referring once again to FIG. 18 a continuous miner may operate to make cuts 262, 264 before being removed to permit roof control procedures to be installed. While such roof control measures are being taken the continuous miner may make cuts 266 and 268. With the completion of roof control procedures at cuts 262 and 264 the continuous miner may re-enter the passageway 256 and make additional cuts 270, 272. The continuous miner is then withdrawn from the area of cuts 270, 272 to permit roof control procedures to be installed and may be transported back to the vicinity of cuts 266 and 268 in order to make further cuts 274 and 275. This procedure is repeated time and time again in order to define new pillars of coal in removing coal from extensions of the main entries 256 and the crosscuts 258.

As best can be seen from a study of FIG. 18 present day coal methods in utilizing continuous miners are largely governed by safety considerations with respect to the installation of mine roof control measures. Much of the time spent during an operating shift with the continuous miner involves the movement or transportation of the miner from cut to cut as roof control procedures are implemented. In fact, it is not unusual for a continuous miner to have as much or more down time in transportation or the like as time spent mining coal.

The process just described involving the making of cuts 262, 264, 266, 268, 270, 272, etc. is one conventional method of the primary mining of coal called the room-and-pillar method.

Secondary mining of coal involves the removal of pillars 260 with the subsequent caving in of the mine roof. Pillar removal in secondary mining is, by its nature, systematic so as not to endanger lives or threaten equipment.

For illustration purposes reference is made to the secondary mining of coal from the mine shown schematically in FIG. 18.

Assume that it is desired to remove the bottommost pillars 260 in FIG. 18. To do this a typical mine roof plan will permit the continuous miner to make an initial cut 276 in the pillar 260 as shown. Once made the continuous miner is removed and a cut 278 is made in an adjacent pillar. Having completed cut 278 the continuous miner is again moved and a third cut 280 is made in a still adjacent pillar. After each of the respective cuts is made mine roof control procedures such as bolting are implemented. With the completion of the third cut 280 the continuous miner returns to the original pillar and makes a second cut in that pillar designated as cut 282. The miner is then removed and proceeds to the adjacent pillar where a cut 284 is made. After completion of cut 284 the miner is removed to the next adjacent pillar and a cut 286 is made. After each of the cuts has been made mine roof control procedures such as bolting are implemented.

In the final stage of secondary mining the miner will return to the end pillar and take diagonal cuts designated 288, 290. Similar diagonal cuts are taken in the adjacent pillar at 292, 294. Finally diagonal cuts 296, 298 are made in the third pillar.

The operation just described is typical of present day mining methods found in approved roof control plans.

FIG. 18 illustrates, therefore, the degree of movement experienced by a continuous miner whether the operation involves primary or secondary mining of coal. As indicated above the extensive movement and transportation of the continuous miner from place to place is necessitated by the safety requirement that the operator of the miner must not be excessively exposed to an unsupported roof.

Applicant's method of mining coal eliminates much of the movement of the continuous miner. Applicant's method involves the use of an extensible cutter assembly extending from a stationary base assembly which permits the cutter assembly to reach out over longer distances in the mining of coal without exposing the operator to an unsupported roof.

With brief reference to FIG. 2 it will be remembered that the apparatus of this invention is comprised of three basic elements, i.e., the cutter assembly 12, conveyor assembly 14 and base assembly 16. The base assembly is fixed firmly in place by means of hydraulic jacks 210, 212. During a cutting operation the cutter assembly 12 is caused to be crowded into the coal face by means of the extensible conveyor assembly 14. The operator stationed at the base assembly 16 is, at all times, protected against an unsupported roof in two ways. First, the base assembly 16 is positioned in a supported area of the mine, that is to say in an area of the mine where roof control procedures have been implemented. Second, the hydraulic jacks 210 provide for localized roof support immediately over the base assembly 16.

As previously described applicant's apparatus permits the cutter assembly 12 to be thrust forward approximately 80–100 feet without requiring the operator to leave the base assembly 16. Thus a cut on the order of magnitude of 80–100 feet may be made in a coal face in a manner so as to expose no miner to an unsupported roof.

Figure 19:
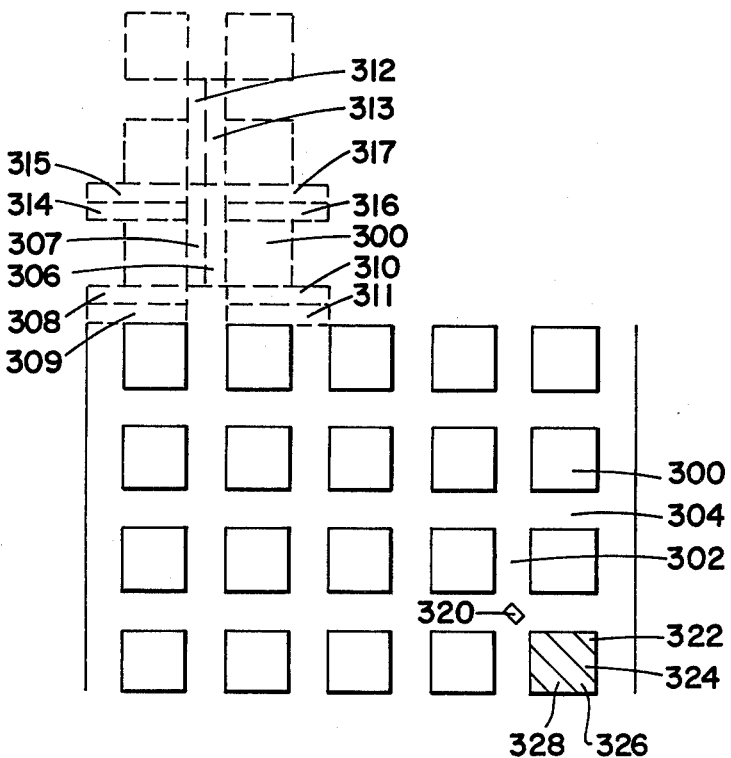
FIG. 19 is a top schematic view of a mine and showing applicant's method of the primary and secondary mining of coal in a room-and-pillar configuration.

The versatility of applicant's apparatus in practicing the method of this invention may be seen from FIG. 19. FIG. 19, like FIG. 18, illustrates a cross-section of a typical mine in which a plurality of pillars 300 have been defined by a plurality of entries 302 and a plurality of crosscuts 304. Assuming that it is desired to extend the mine in an upward direction of FIG. 19 applicant's apparatus and method provide for the making of single cuts 306 and 307 at one time. Remembering that the pillar dimensions in the example given with respect to FIG. 18 and FIG. 19 are approximately 50 by 50 feet and that the crosscut widths are approximately 20 feet, it will be seen that the longitudinal length of the cuts 306 and 307 is approximately 70 feet. Bearing in mind that applicant's apparatus is capable of making continuous cuts of 80–100 feet it may be seen that the 70 foot cuts 306 and 307 of FIG. 19 are readily within the capability of the miner of this invention. Having made the cuts 306 and 307 the miner may then be turned 90 degrees where additional cuts 308, 309 are made. After completion of cuts 308 and 309 still further cuts 310, 311 may then be made.

Of course it should be appreciated that after cuts 306, 307 are made roof bolting procedures will be implemented while the cuts 308, 309 are being made. Similarly while cuts 310, 311 are being made roof bolting procedures will be implemented in the area of cuts 308, 309. After roof bolting has been completed the continuous miner of this invention may then be moved into position in order to make the next cuts 312, 313. Thereafter, cuts 314, 315 and 316, 317 may be made.

It can be appreciated from a study of FIG. 19 that the extensive reach of applicant's apparatus makes it possible to readily conduct primary mining of coal in a mine. Since the extensible cutter is able to reach out for fairly large distances in excess of the dimensions of the coal pillars and passageways it can be seen that applicant's apparatus may be conveniently positioned to make cuts in the entryways and crosscuts without significant movement of the miner. The geometric pattern illustrated in FIG. 19 may be repeated as often as is necessary in order to provide for the primary mining of coal in the manner illustrated.

As to the secondary mining of coal applicant's apparatus and method provides significant advantages not heretofore found. With further reference to FIG. 19 let us assume that it is desired to remove a part or all of the lower or bottom pillars 300 illustrated in FIG. 19. Assuming that it is desired to remove the lower right-hand pillar of FIG. 19 the continuous miner of this invention may be advantageously positioned at 320 where a plurality of continuous cuts 322, 324, 326 and 328 may be made in the pillar to remove substantially all of the pillar. During the secondary mining operation just described the miner, while positioned at 320, receives the roof support provided by adjacent pillars. In addition timbers or other auxiliary supports may be used. The necessity, however, of making small cuts in the pillar with subsequent roof bolting is eliminated as the cutter assembly of applicant's apparatus is capable of being extended through an entire pillar in a single reach.

Figure 20:
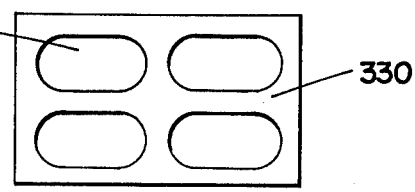
FIG. 20 is a schematic view of a pillar and showing applicant's modified method of the secondary mining of coal.

If it is not desired to remove an entire pillar in secondary mining a procedure such as that shown schematically in FIG. 20 may be employed. In FIG. 20 there is shown schematically a pillar 330 in which a plurality of auger-like cuts 332 have been made through the pillar leaving some of the pillar in place.

METHOD OF PRIMARY MINING

Applicant's method of primary mining of underground coal consists of the following method steps:

(a) providing a continuous miner having a cutter assembly, conveyor assembly and base assembly. These elements are shown as 12, 14, 16 respectively in FIG. 1. The cutter assembly 12 is adapted to be projected outwardly from the fixed base assembly 16 (FIG. 2) in a manner so as to be crowded or forced into the face of a coal seam 70. The conveyor assembly 14, which is positioned intermediate the cutter assembly 12 and the base assembly 16, provides an end thrust on the cutter assembly 12 forcing the cutter assembly 12 into the coal face while, at the same time, defining an extensible or variable length conveyor means between the cutter assembly and the fixed base in order to transport coal from the cutter assembly to the fixed base.

(b) positioning the base assembly of the continuous miner (with the conveyor assembly in a collapsed condition such as shown in FIG. 14) at a fixed point in an area of the mine where there is roof support. The base assembly 16 (FIG. 2) which includes hydraulic cylinders 210 may be positioned in a manner so that the hydraulic cylinders 210 provide for roof support or, alternately, roof support means (such as bolts) may be provided in the roof itself.

(c) causing the cutter assembly 12 to be projected outwardly from the fixed base assembly 16 into the coal face with the variable length conveyor assembly 14 being positioned intermediate the cutter assembly 12 and the fixed base assembly 16.

(d) causing the cutter assembly 12 to travel away from the fixed base assembly 16 a distance equal to the dimension of the pillar being formed and the width of the passageway or crosscut adjacent the pillar being formed to make a first cut. Referring to FIG. 19 it will be seen that the length of the cut 306 is equal to the length of the pillar 300 and the width of the adjacent passageway which will be formed by the cuts 316, 317. In the example given above a pillar formed in a room-and-pillar manner of coal extraction may typically have a square dimension of 50 feet on a side. The adjacent passageways will typically have widths of approximately 20 feet. Thus, with the example just given, the cut 306 of FIG. 19 has a lengthwise dimension of approximately 70 feet.

(e) causing the cutter assembly to make additional cuts parallel to the first cut to remove all of the coal from the passageway being formed. Such additional cuts (along with the first cut) define cuts 306, 307 in FIG. 19.

(f) rotating the continuous miner approximately 90 degrees and causing additional passageways to be formed. Reference is made, in this regard, to cuts 308, 309 and 310, 311 in FIG. 19. While the additional passageways are being formed roof control procedures are undertaken with respect to the passageway formed by cuts 306, 307 and subsequently formed passageways.

(g) At such time as the three intersecting passageways are formed by the continuous miner (passageways defined by cuts 306, 307; cuts 308, 309; and cuts 310, 311) the continuous miner is then moved into the passageway formed by cuts 306, 307 to a position in order to make cuts 312, 313 where the entire process is then repeated. At each fixed location of the continuous miner three intersecting passageways are formed. As a consequence a plurality of pillars defined by intersecting main passageways and crosscuts are defined by applicant's method with a minimum of transportation of the continuous miner.

METHOD OF SECONDARY MINING OF COAL

Applicant's method for the secondary mining of coal will now be described with reference to FIG. 19.

As was indicated above, the secondary mining of coal involves the removal of coal from pillars in such a manner that the pillar is either totally or partially destroyed. Applicant's method involves the following steps:

(a) providing a continuous miner having a cutter assembly, conveyor assembly and base assembly as shown in FIGS. 1 and 2;

(b) stationing the base assembly of the continuous miner at a point adjacent the pillar to be removed. Such a point is shown at 320 in FIG. 19 and may, if desired, be in a portion of the mine having roof support measures installed;

(c) extending the cutter assembly away from the fixed base assembly a distance sufficient to permit the cutter assembly to extend completely through the pillar to be removed in order to make a single continuous cut through the entire pillar;

(d) repositioning the continuous miner in order to make additional cuts through the pillar thereby to remove a portion or all of the pillar.

As shown in FIG. 20 applicant's method for the secondary mining of coal may be used to remove coal in an auger like fashion from pillars such as shown by cuts 332 in pillar 330. The upper cuts as shown in FIG. 20 are made by causing the base assembly 16 to be raised off of the floor of the mine thus permitting the cutter assembly 12 and the conveyor assembly 14 to be raised in a position to contact the coal face near the roof of the mine.

The ability to raise and lower the base assembly 16 through the use of hydraulic jacks (as shown in FIG. 2) not only permits applicant's method to be used for the secondary mining of coal in the manner shown in FIG. 20 but also gives flexibility in the primary mining of coal as it is possible to position the cutter assembly to remove individual layers of coal from the coal seam as desired. For example, it is possible to position the base assembly 16 (and, consequently, the cutter assembly 12 and conveyor assembly 14) relative to the mine face 70 (FIG. 2) in a manner to permit the removal of higher grades of coal from a seam in a single cutting operation while removing lower grades of coal in subsequent cutting operations.

What is claimed is:

1. A method for the primary mining of coal from an underground seam in a room-and-pillar manner comprising the steps of:

(a) providing a continuous miner having a cutter assembly, a variable length conveyor assembly and a base assembly, said conveyor assembly being positioned between said cutter assembly and said base assembly so as to convey coal from said cutter assembly to said base assembly while said cutter assembly is cutting, said cutter assembly being capable of moving outwardly into a coal face;

(b) positioning the continuous miner with the conveyor assembly in a retracted condition and with the base assembly in a stationary location substantially adjacent the exposed face of coal to be mined;

(c) causing the cutter assembly to extend outwardly into the coal face, the conveyor assembly providing variable length conveying means between the cutter assembly and the base assembly for the movement of coal from the cutter assembly to the base assembly, the cutter assembly being caused to extend outwardly at least sixteen (16) feet from its starting position.

2. The method of claim 1 in which said cutter assembly is caused to extend outwardly a distance at least equal to the dimension of the pillar being formed by the mining operation.

3. The method of claim 2 in which said cutter assembly is caused to extend outwardly a distance at least equal to the dimension of the pillar being formed and, in addition, a distance equal to the width of the cross passageway to be defined adjacent the pillar.

4. A method for the primary mining of coal using the room-and-pillar technique by which a plurality of passageways are defined in a coal seam, some of said passageways defining entries and some of said passageways defining crosscuts, said entries and said crosscuts forming a plurality of pillars, said method comprising the steps of:

(a) providing a continuous miner including a cutter assembly, a variable length conveyor assembly and a base assembly, said conveyor assembly being positioned between said cutter assembly and said base assembly so as to convey coal from said cutter assembly to said base assembly while said cutter assembly is cutting;

(b) positioning said miner with said conveyor assembly in a retracted condition adjacent the exposed face of coal to be mined;

(c) causing the cutter assembly to be projected into the coal face whereby an elongated cut is made in the coal face, the cutter assembly being caused to extend outwardly at least sixteen (16) feet from its starting position;

(d) repeating the cutting operation of step (c) above a number of times sufficient to define a passageway in said seam having a desired width and a desired length, said length being equal to the dimension of the pillar to be formed in the mining operation plus the width of a crosscut to be formed adjacent said pillar.

5. The invention of claim 4 in which said method includes the further step of (e) repositioning said continuous miner in an orientation approximately transverse to the orientation of step (b) and (f) making a series of cuts as in steps (c) and (d) so as to define an intersecting passageway having a desired width and a desired length, the length being equal to the sum of the dimension of the pillar to be formed plus the width of the passageway to be formed adjacent the pillar.

6. The method of claim 5 in which there is performed the additional step of (g) implementing mine roof control procedures with respect to the passageway defined by the cuts of step (d) while the cuts of step (f) are being made.

7. A method of primary mining of coal from an underground seam in which a plurality of first passageways are defined in said seam and a plurality of second passageways are defined in said seam, said first passageways being approximately perpendicular to said second passageways and said first and second passageways together defining a plurality of pillars, said method comprising the steps of:

(a) providing a continuous miner having a cutter assembly, a variable length conveyor assembly and a base assembly, the conveyor assembly being positioned between said cutter assembly and said base assembly so as to convey coal from said cutter assembly to said base assembly while said cutter assembly is cutting;

(b) positioned said miner with said conveyor assembly in a retracted condition at the exposed face of coal to be mined;

(c) causing the cutter assembly to be extended in a plurality of cuts in the exposed coal face, said cuts defining a first passageway having a given width and a given length, said length being equal to the dimension of the pillar to be formed plus the width of the intersecting passageways to be formed adjacent said pillar, the cutter assembly being caused to extend outwardly at least sixteen (16) feet from its starting position;

(d) causing a series of additional cuts to be made as those of step (c) in a direction approximately perpendicular to the first passageway thereby defining a second passageway having a width and a length approximately equal to that of said first passageway;

(e) causing still additional cuts to be made in the coal face so as to form a third passageway, said third passageway being in approximate alignment with said second passageway and approximately perpendicular to said first passageway;

(f) implementing roof control procedures in the respective first, second and third passageways at such time as cutting operations with respect to such passageways have been completed;

(g) moving and relocating the continuous miner to the end of the respective first, second and third passageways formed by steps (c), (d) and (e), whereby additional passageways 4, 5 and 6, 7, 8, and 9, 10, 11 and 12 are formed;

the respective passageways formed by the respective cuts defining a plurality of parallel passageways, a plurality of intersecting passageways and a plurality of pillars.

8. A method for secondary mining of coal from an underground seam in which there are defined a plurality of pillars, said method comprising the steps of:

(a) providing a continuous miner having a cutter assembly, a variable length conveyor assembly and a base assembly;

(b) positioning said miner at a location approximately adjacent the pillar to be removed with said conveyor assembly in a retracted position;

(c) causing the cutter assembly to be extended into the pillar so as to extend substantially through the entire pillar, the cutter assembly being caused to extend outwardly at least sixteen (16) feet from its starting position;

(d) repeating the cutting operation of step (c) a number of times sufficient to remove a part or all of the pillar as desired.

9. An apparatus for the continuous mining of coal from an underground seam comprising in combination:

(a) a cutter assembly, said cutter assembly having a plurality of cutters adapted to remove coal from an exposed coal face;

(b) a base assembly, said base assembly having propulsion means associated therewith for moving the continuous miner;

(c) a conveyor assembly supported by said base assembly and positioned between said cutter assembly and said base assembly, said conveyor assembly providing support for said cutter assembly, said conveyor assembly being defined by a plurality of telescoping, box-like support elements, said support elements being carried by said base assembly there being defined two sections of telescoping members positioned on either side of an endless conveyor belt, each of said telescoping members having associated therewith a longitudinal support, the respective telescoping members and their respective longitudinal supports providing roller support means for an endless belt which extends between a position substantially adjacent said cutter assembly to said base assembly, at least one control means associated with said telescoping members for causing said telescoping members to be extended outwardly, or, alternately, retracted;

(d) means to fix said base assembly in place during cutting so that said base assembly acts as a reaction member for said cutter assembly as it is advanced into a coal face.

10. The invention of claim 9 in which said conveyor assembly is defined by an endless belt extending between said cutter assembly and said base assembly, said endless belt having take-up means permitting the longitudinal length of the conveyor means to be varied.

11. The invention of claim 9 in which said telescoping members are extended and retracted by means of a control cable.

12. The invention of claim 9 in which said telescoping members are extended and retracted by means of roller chains.

13. The invention of claim 9 in which said telescoping members are extended and retracted by means of hydraulic cylinders.

14. The invention of claim 9 in which said base assembly is provided with substantially vertical extensible cylinder means to enable the base assembly to be positioned at variable heights within the mine.

15. The invention of claim 9 in which said base assembly is provided with substantially vertical extensible cylinder means to enable the base assembly to be fixed in position to define a reaction base for the cutter assembly.

16. An apparatus for the continuous mining of coal from an underground seam comprising in combination:

(a) a cutter assembly, said cutter assembly having a plurality of cutters and a plurality of auger elements, said cutters adapted to remove coal from an exposed coal face while said augers are adapted to move the removed coal from a location at the cutter assembly adjacent the face of coal being mined to a location at the cutter assembly adjacent a conveyor assembly;

(b) a conveyor assembly positioned between said cutter assembly and a base assembly, said conveyor assembly providing support for said cutter assembly, said conveyor assembly being defined by a plurality of telescoping box like support elements, said support elements being carried by a base assembly there being defined two sections of telescoping members positioned on either side of an endless conveyor belt, each of said telescoping members having associated therewith a longitudinal support, the respective telescoping members and the respective longitudinal supports providing roller support means for an endless belt which extends between a position substantially adjacent the cutter assembly to a base assembly, at least one control cable positioned within said telescoping members for causing said telescoping members to be extended outwardly or, alternately, retracted;

(c) a base assembly providing support for said conveyor assembly, said base assembly having propulsion means associated therewith for moving the continuous miner;

(d) extensible hydraulic cylinder means associated with said base assembly and extending in a generally vertical direction relative to said base assembly in order to provide for a height adjustment of said base assembly within a mine.

17. The invention of claim 16 in which said cutters are carried by two generally longitudinally disposed auger elements, there being a third generally transversely disposed auger element positioned inwardly of said longitudinally disposed auger elements.

18. The invention of claim 16 in which said cutter assembly is pivotally supported by said conveyor assembly there being provided attitude adjustment means for said cutter assembly carried by said conveyor assembly.

19. The invention of claim 16 in which said telescoping support elements are generally rectangular in cross section and of various sizes so as to be capable of being nested together there being provided internal rollers within the nested telescoping elements to provide support for such elements.

20. The invention of claim 19 in which internal cable rollers are provided within the nested telescoping elements in order to receive a control cable disposed within said elements.

21. The invention of claim 20 in which said control cable is driven, at one end thereof, by first drive means located within said base assembly, threaded through the respective cable rollers of the respective telescoping elements and directed back to the base assembly where the second end of said cable means is driven by a second drive means.

22. The invention of claim 16 in which said telescoping members provide roller support for the upper portion of said endless belt and said longitudinal supports provide roller support for the lower portion of said endless belt.

23. The invention of claim 22 in which said endless belt is driven by an internal drive means within said base assembly, said drive means including means therewithin to adjust the tension of the belt with changes in the longitudinal length of said conveyor assembly.

* * * * *